United States Patent
Au et al.

(10) Patent No.: US 6,445,635 B1
(45) Date of Patent: Sep. 3, 2002

(54) HIGH SPEED ASYNCHRONOUS AND PROGRAMMABLE STATE MACHINE FOR GENERATING ALMOST EMPTY SYNCHRONOUS FLAGS IN A SYNCHRONOUS FIFO

(75) Inventors: Johnie Au, Cupertino; Chia Jen Chang, San Jose; Parinda Mekara, Sunnyvale, all of CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 09/895,305

(22) Filed: Jun. 30, 2001

(51) Int. Cl.[7] ................................................. G11C 7/00
(52) U.S. Cl. .................. 365/221; 365/189.05; 365/235; 710/57
(58) Field of Search ............................ 365/221, 189.05, 365/235; 326/96, 46; 710/57, 156

(56) References Cited

U.S. PATENT DOCUMENTS

| | | | | |
|---|---|---|---|---|
| 5,487,049 A | * | 1/1996 | Hang | 365/221 |
| 5,963,056 A | * | 10/1999 | Narayana et al. | 326/96 |
| 5,991,834 A | * | 11/1999 | Hawkins et al. | 710/57 |
| 6,016,403 A | * | 1/2000 | Hawkins et al. | 395/877 |

OTHER PUBLICATIONS

Johnie Au et al., "High Speed FIFO Synchronous Programmable Full and Empty Flag Generation", U.S. Ser. No. 09/957, 587, Filed Sep. 20, 2001.

Johnie Au et al., "High Speed Asynchronous and Programmable State Machine for Generating Almost Empty Synchronous Flags in a Synchronous FIFO", U.S. Ser. No. 09/895,306, Filed Jun. 30, 2001.

Johnie Au et al., "High Speed FIFO Synchronous Programmable Full and Empty Generation", U.S. Ser. No. 09/957, 015, Filed Sep. 20, 2001.

* cited by examiner

*Primary Examiner*—Son T. Dinh
(74) *Attorney, Agent, or Firm*—Christopher P. Malorana, P.C.

(57) ABSTRACT

A state machine comprising a first input receiving a first write clock, a second input receiving a first read clock, a third input receiving a first programmable Almost Empty look-ahead signal, a fourth input receiving a second write clock, a fifth input receiving a second read clock, and a sixth input receiving a second programmable Almost Empty look-ahead signal is disclosed. The state machine manipulates the inputs to produce an output signal representing an Almost Empty output flag that is at a first logic state when a FIFO is Almost Empty and is at a second logic state when the FIFO is Not Almost Empty.

52 Claims, 5 Drawing Sheets

PAE - LOGIC CHANGES STATE ONLY AT RISING EDGE OF ENABLED READ CLOCK ns and shift-out signals are
derived from a common frequency source or clock, so that
there is a precise, known relationship between them- the
FIFO is by definition is in the synchronous mode. The key
advantages of the synchronous FIFO over the asynchronous
FIFO, are as follows:

(A) Registered interfaces at the input and output provide
the simplest and fastest FIFO interfacing because all
signals are synchronized to the rising edges of the read
or write system clocks, which run continuously and are
applied directly to the FIFO;

(B) Read and write operations are easily manipulated by
external, synchronous read and write state machines,
which in turn are controlled by the read and write
system clocks; the flags are internally synchronized to
their respective clocks, and external synchronizers are
no longer needed;

(C) Read and write operations are controlled by enables,
thereby eliminating any need for externally-generated
read and write strobes; noise immunity is improved
because the enable signals are sampled during the
rising edge of the clock rather than in response to a
level, thus increasing the reliability.

Accordingly, the following discussion is focused on synchronous FIFOs. Typical FIFO includes a 64 Kbit depth and 80 bits width, whereas the word is typically 80 bits long. One pointer, read or write, points to only one word. However, the "read out" or "write in" operations can be implemented in 4 modes: (a) read out 80-mode, (b) write in 80-mode (at each clock the whole word is read out or written in), (c) read out 40-mode, and (d) write in 40-mode (at each two clocks the whole word is read out or written in).

The number of words N retained in the FIFO memory is as follows:

$$N=W-R; \quad (1)$$

wherein W is the number of words written into the memory; and R is the number of words that are read out from the memory.

To prevent a "too fast" read out, a read enables clock is activated only after a first word is written into the FIFO memory buffer. Thus, the read out operation has to wait depending on the particular FIFO device between (2–4) clocks before the first word is read out. For the second word there is no such limitation. Each time a FIFO is completely read out, an Empty flag is generated by a state machine. An enabling signal delays the generation of an Empty flag, that is the change of the Empty flag state from "zero" to "one is delayed, by a waiting period between (2–4) clocks needed for the first word to be read out. This prevents reading out a word that has not been written in yet. The reading out of a word before the word has been written is called underflow. The time needed for the first word to come out from the FIFO buffer is called the fall through time.

For the complementary situation, when the writing in is done very fast, and the read out is very slow, a FIFO can be filled over capacity. This situation is called overflow. To prevent the overflow from happening, the Full flag is generated by the enabling Full signal to indicate that the writing into the FIFO should stop before the first word is read out.

The prior art "Almost" Empty flags were used to indicate that only few words X are left in the FIFO buffer. Thus, an offset X defining the word "Almost", is also an "Almost Empty" threshold. The Almost Empty offset, or threshold, X is a user programmable offset. The user can set an offset value X anywhere between Full and Empty so that if the number of words N left in a FIFO is less than the threshold X, the read out is impossible, and an Almost Empty Flag is generated:

$$\text{If } ((N=W-R) \leq X) \text{ then Almost\_Empty\_}N=0; \quad (2)$$

wherein W is the number of words that are written in, R is the number of words that are read out, and Almost_Empty_N is a read pointer.

Complementary, if the programmable threshold for the amount of memory space (measured in words) left is Y, and if the actual memory space left in a FIFO is less than the threshold Y, the write in to the FIFO is restricted, and an Almost Full flag is generated:

$$\text{If } (((\text{Depth}-(W-R)) \leq Y) \text{ then Almost\_Full\_}N=0; \quad (3)$$

wherein Depth is the depth of the FIFO, W is the number of words that are written in, R is the number of words that are read out, and Almost_Full_N is a write pointer.

The prior art implementation of the Almost Empty and Almost Full flag generators was done by using a traditional "adder approach". In this traditional "adder approach", the relationship (2) and /or (3) are implemented by using a write counter, a read counter, a program value offset register, a triple input carry look ahead adder/comparator (including a prediction algorithm to predict the next value), and an adder glitch filter (to minimize noise).

The problem with this prior art "adder approach" is that the triple input carry look ahead adder/comparator is too slow because in order to do additions and comparisons, the prior art adder circuitry requires 6 nsec.

What is needed is to implement the relationship (2) and (3) without an adder in order to significantly reduce the time required for this operation.

SUMMARY OF THE INVENTION

The present invention provides a high speed asynchronous and programmable state machine utilized for generating Almost Empty synchronous flags in a synchronous FIFO. The present invention uses a "state machine approach" and eliminates an adder altogether. In the present "state machine approach" a look ahead signal is generated when the following logical statements reach the true value:

$$\text{If } (W==(R+X)), \text{ then look ahead\_signal}=1; \quad (4)$$

and/or $$\text{If } (W==R+\text{Depth}-(Y+1)), \text{ then lookahead}_{\_signal}=1. \quad (5)$$

X (and /or (Y+1)) offset are pre-loaded into the read pointer, the write pointer is reset to "0", and only a comparator is required to check the 'true' or 'false' value of the logical statement (4) (and /or (5)) thus significantly reducing the time required for this operation as compared with the prior art "adder" approach for generating Almost Empty flags.

More specifically, one aspect of the present invention is directed to a state machine. In one embodiment, the state machine comprises: (1) a first input receiving a first write clock, (2) a second input receiving a first read clock, (3) a third input receiving a first programmable Almost Empty look-ahead signal, (4) a fourth input receiving a second write clock, (5) a fifth input receiving a second read clock, and (6) a sixth input receiving a second programmable Almost Empty look-ahead signal. The state machine manipulates the inputs to produce an output signal representing an Almost Empty output flag that is at a first logic state when a FIFO is Almost Empty and is at a second logic state when the FIFO is Not Almost Empty.

Another aspect of the present invention is directed to an apparatus comprising: (1) a first set state machine having a first input receiving a first write clock, a second input receiving a first read clock, a third input receiving a first programmable Almost Empty look-ahead signal, and a fourth input to receive a first control signal; (2) a second set state machine having a first input receiving a second write clock, a second input receiving a second read clock, a third input receiving a second programmable Almost Empty look-ahead signal, and a fourth input to receive a second control signal; and (3) a synchronizer coupled to the second set state machine. The first set state machine manipulates its inputs to produce a first set_output signal that is either at a first logic state or at a second logic state, whereas the second set state machine manipulates its inputs to produce a second set_output signal that is either at the first logic state or at the second logic state. The synchronizer receives the second set_output signal and receiving a reset signal. The synchronizer is configured to generate a synchronized output signal.

The apparatus of the present invention further comprises: (4) a latch having a first input receiving the first set_output signal, and a second input receiving the synchronized output signal. A first latch_output presents the first set_output signal as a first latch_output signal, whereas a second latch_output presents the synchronized output signal as a second latch_output signal. The latch is configured to hold the first latch_output signal and the second latch_output signal until the first set_output signal and second set_output signal change logic states. The first latch_output signal represents an Almost Empty output flag that is at a first logic state when a FIFO memory block is Almost Empty, and is at a second lo logic state when the FIFO is Not Almost Empty. The second latch_output signal represents the Not Almost Empty output flag that is at the first logic state when the FIFO is Not Almost Empty and is at the second logic state when the FIFO is Almost Empty.

The apparatus of the present invention further comprises: (5) a first logic block having a logic input receiving the second latch_output signal, and (6) a second logic block having a logic input receiving the first latch_output signal. The first logic block includes a logic output presenting the second latch_output signal as the first control signal to the first set state machine; wherein the second logic block has a first logic output presenting the first latch_output signal as the second control signal to the second set state machine; and a second logic output presenting the first latch_output signal as the reset signal to the synchronizer.

In one embodiment of the present invention, the synchronizer further includes an SR latch coupled to the second set state machine. The SR latch is configured to receive the second set_output signal from the second set state machine, and the reset signal from the second logic block, and is configured to time an output of the second set_output signal depending on the reset signal. A Flip-Flop (FF) block coupled to the SR latch is configured to receive the second set_output signal, and configured to time the presentation of the second set_output signal as the synchronized signal depending on an external timing signal.

In the preferred embodiment, the FIFO comprises a synchronous FIFO; the external timing signal comprises a free running read clock signal; the first write clock comprises a first enabled write clock; the first read clock comprises a first enabled read clock; the second write clock comprises a second enabled write clock; and the second read clock includes a second enabled read clock.

In one embodiment, the apparatus of the present invention further comprises a first delay block configured to provide a first predetermined delay to the first set_output signal in order to increase a pulse width of the first set_output signal. In one embodiment, the apparatus of the present invention further comprises a second delay block configured to provide a second predetermined delay to the second set_output signal in order to increase a pulse width of the second set_output signal. In one embodiment, the first delay block further includes a first programmable delay block configured to change a pulse width of the first set_output signal. In one embodiment, the second delay block further includes a second programmable delay block configured to change a pulse width of the second set_output signal.

One more aspect of the present invention is directed to a method for determining the almost emptiness of at least one memory buffer. In one embodiment, the method of the present invention further comprises the following steps: (1) generating at least one Almost Empty output flag in response to a plurality of signals comprising: a first write clock, a first read clock, a first programmable Almost Empty look-ahead signal, a second write clock, a second read clock, and a second programmable Almost Empty look-ahead signal; (2) generating at least one Not Almost Empty output flag in response to a plurality of signals comprising: a first write clock, a first read clock, a first programmable Almost Empty look-ahead signal, a second write clock, a second read clock, and a second programmable Almost Empty look-ahead signal; and (3) presenting the first write clock, the first read clock, the first programmable Almost Empty look-ahead signal, the second write clock, the second read clock, and the second programmable Almost Empty look-ahead signal to a state machine.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawing. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The main idea of the present invention is to use a FIFO memory buffer to provide a temporary memory buffer or storage between two communication systems. The traditional timing critical path of the adder is removed. The programmable Empty flag of a FIFO is used as an interrupt to warn the system when the FIFO buffer becomes Almost Empty which then blocks further read operations. By programming a user defined Programmable Almost Empty (PAE) offset, the system can monitor the PAE flag, and when the number of words in the FIFO drops below the threshold, the system will pause further reads to prevent underflow. This status flag is generated in real-time so as not to underflow the buffer.

Figure 1:
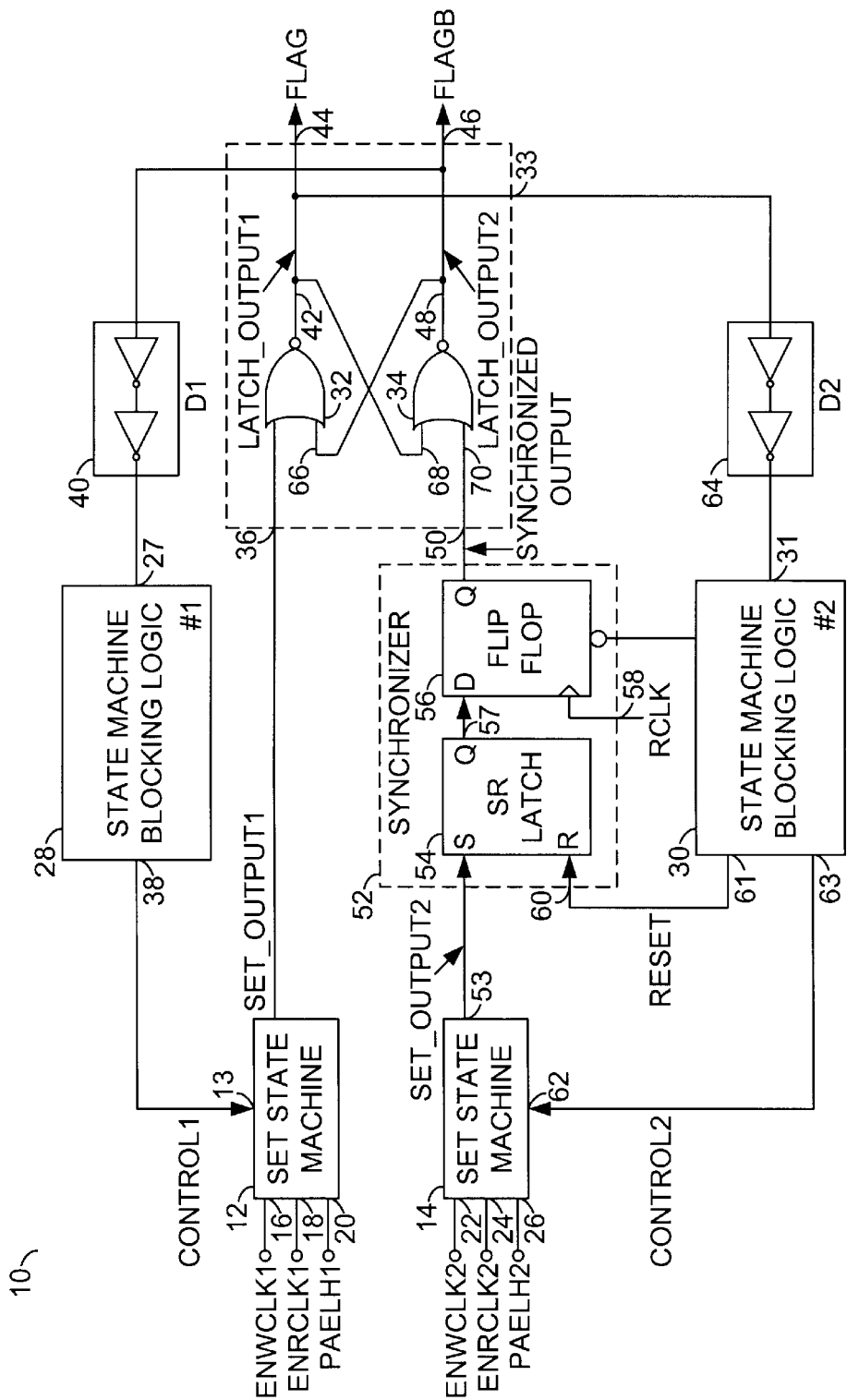
FIG. 1 depicts a block diagram of the Programmable Almost Empty (PAE) flag generator of the present invention.

FIG. 1 depicts a block diagram 10 of the Programmable Almost Empty flag generator of the present invention. The block diagram 10 includes a new design methodology to generate high speed synchronous Almost Empty flag status for a FIFO without using an adder. In the preferred embodiment, an asynchronous state machine approach is used. In one embodiment, the Almost Empty flag generator 10 (of FIG. 1) can be used for high speed (266 MHz+, 3.76 ns–cycle) applications.

In one embodiment, the PAE flag generator 10 comprises a first set state machine block 12, a second set state machine 14, a latch 33, a synchronizer 52, a first state machine blocking logic block 28, and a second state machine blocking logic block 30.

The first set state machine 12 has a first input 16 that receives a signal $Enwclk_1$ which represents a first enabled write clock, a second input 18 that receives a signal $Enrclk_1$ representing a first enabled read clock, a third input 20 that receives a signal $Paelh_1$ which is a first programmable Almost Empty look-ahead signal and a fourth input 13 which receives a first control signal $Control_1$. The first enabled read clock $Enrclk_1$ and the first enabled write clock $Enwclk_1$ each drive a counter. Each of these counters have two built-in sub-counters. A first sub-counter is an exact sub-counter and starts counting from zero after a reset signal. A second sub-counter is a plus one counter that starts counting from one after a reset. The first programmable Almost Empty look-ahead signal $Paelh_1$ is a signal that is generated externally from the set state machine 12, but internally to the FIFO (not shown) and is a result of a bitwise exclusive OR of the plus one read sub-counter and the exact write sub-counter. The first set state machine 12 manipulates the inputs 16, 18, 20 and 13 (see discussion below) to produce a first output signal 36 that is either at the first logic state or at the second logic state. The first set state machine output 36 changes its logical state only at a rising edge of enabled first read clock signal $Enrclk_1$ 18.

Similarly, the second set state machine 14 has a first input 22 that receives a signal $Enwclk_2$ which represents a second enabled write clock, a second input 24 that receives a signal $Enrclk_2$ representing a second enabled read clock, a third input 26 that receives a signal $Paelh_2$ which is a second programmable Almost Empty look-ahead signal and a fourth input 62 which receives a second control signal $Control_2$. The second enabled read clock $Enrclk_2$ (and the second enabled write clock $Enwclk_2$) drives a counter. Each of these counters have two built-in sub-counters. A first sub-counter is an exact sub-counter and starts counting from zero after a reset signal. A second sub-counter is a plus one counter that starts counting from one after a reset. The second programmable Almost Empty look-ahead signal $Paelh_2$ is a signal that is generated externally from the second set state machine 14, but internally to the FIFO (not shown) and is a result of a bitwise exclusive OR of the plus one read sub-counter and the exact write sub-counter. The second set state machine 14 manipulates the inputs 22, 24, 26 and 62 (see discussion below) to produce a second output signal 53 that is either at the first logic state or at the second logic state. The second set state machine output signal that changes its logical state only at the rising of the enabled second read clock signal $Enrclk_2$ 24.

Referring still to FIG. 1, the PAE flag generator 10 further includes a synchronizer 52 coupled to the second set state machine 14. The synchronizer 54 receives the second set state machine output signal 53, receives a reset signal 60, and generates a synchronized output signal 50.

Referring still to FIG. 1, the apparatus 10 further includes a latch 33 having a first input 64 receiving the output signal 36 from the first set state machine 12, and a second input 70 receiving the synchronized output signal 50 from the synchronizer 52. A first latch output 42 presents the first set machine output signal 36 as a first latch output signal 44, and a second latch output 48 presents the synchronized output signal 50 as a second latch output signal 46. The latch 33 is configured to hold the first latch output signal and the second latch output signal until the first set machine output signal 36 and second set output signal 53 change logic states. The first latch output signal 44 represents an Almost Empty output flag that is at a first logic state when a FIFO block is Almost Empty, and is at a second logic state when the FIFO is Not Almost Empty. The second latch output signal 46 represents Not Almost Empty output flag that is at the first logic state when the FIFO is Not Almost Empty and is at the second logic state when the FIFO is Almost Empty.

Referring still to FIG. 1, the apparatus 10 further includes a first set state machine logic block 28 having a logic input 27 receiving the second latch output signal 46, and a logic output 38 presenting the second latch output signal 46 as the first control signal 13 to the first set state machine 12. The apparatus 10 also includes a second logic block 30 having a logic input 31 receiving the first latch output signal 44, a first logic output 61 presenting the first latch output signal 44 as the second control signal 62 to the second set state machine 14, and a second logic output 61 presenting the first latch output signal 44 as the reset signal 60 to the synchronizer 52.

Figure 2A:
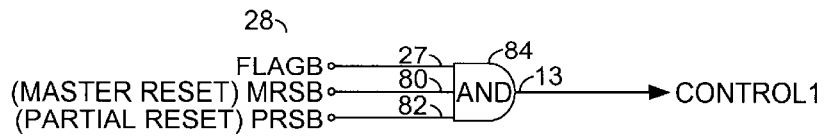
FIG. 2A illustrates the first set machine blocking logic block configured to generate a first control signal.
Figure 2B:
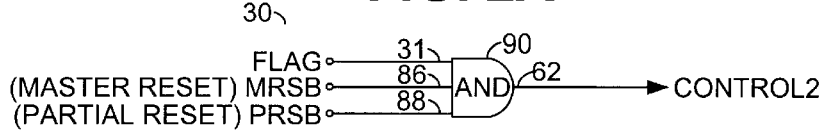
FIG. 2B shows the second set machine blocking logic block configured to generate a second control signal.

FIG. 2A depicts the first set machine blocking logic block 28 in more details. The AND gate 84 manipulates the input signal flag (the reversed flag signal 44), the master reset signal mrsb 80, and the partial reset signal prsb 82 to generate the first control signal 13. Similarly, FIG. 2B illustrates the second set machine blocking logic block 30 having the AND gate 90. The AND gate 90 manipulates the input flag signal 44, the master reset signal mrsb 86, and the partial reset signal prsb 88 to generate the second control signal 62.

Referring still to FIG. 1, in the preferred embodiment, the synchronizer 52 further includes an SR latch 54 coupled to the second set state machine 14. The SR latch 54 is configured to receive the second set output signal 53 from the second set state machine 14, and is configured to receive the reset signal 60 from the second set state machine logic block 30. The SR latch 54 is configured to time its output 57 of the second set output signal 53 depending on the reset signal 61. Please, see discussion below.

Referring still to FIG. 1, in the preferred embodiment, the synchronizer 52 further includes a Flip-Flop (FF) block 56 coupled to the SR latch 54. The FF 56 is configured to receive the second set machine output signal 57 presented by the from the SR latch, and is configured to time the presentation of the second set output signal 57 as the synchronized signal 50 depending on an external timing signal 58. In the preferred embodiment, the external timing signal further comprises a free running read clock signal rCLK 58. The signal rCLK (as well as a free running write clock signal wCLK) is a free running externally generated clock. The actual reading (or writing) is performed by additionally providing a synchronous read (write) enable input signal to the FIFO. When the enable input is active in a clock cycle, internally to the FIFO, an enabled read (write) clock is generated. These are represented by the Enrclk inputs 18 and 24. and the Enwclk inputs 16 and 22 to the set state machines 12 and 14.

Figure 3:
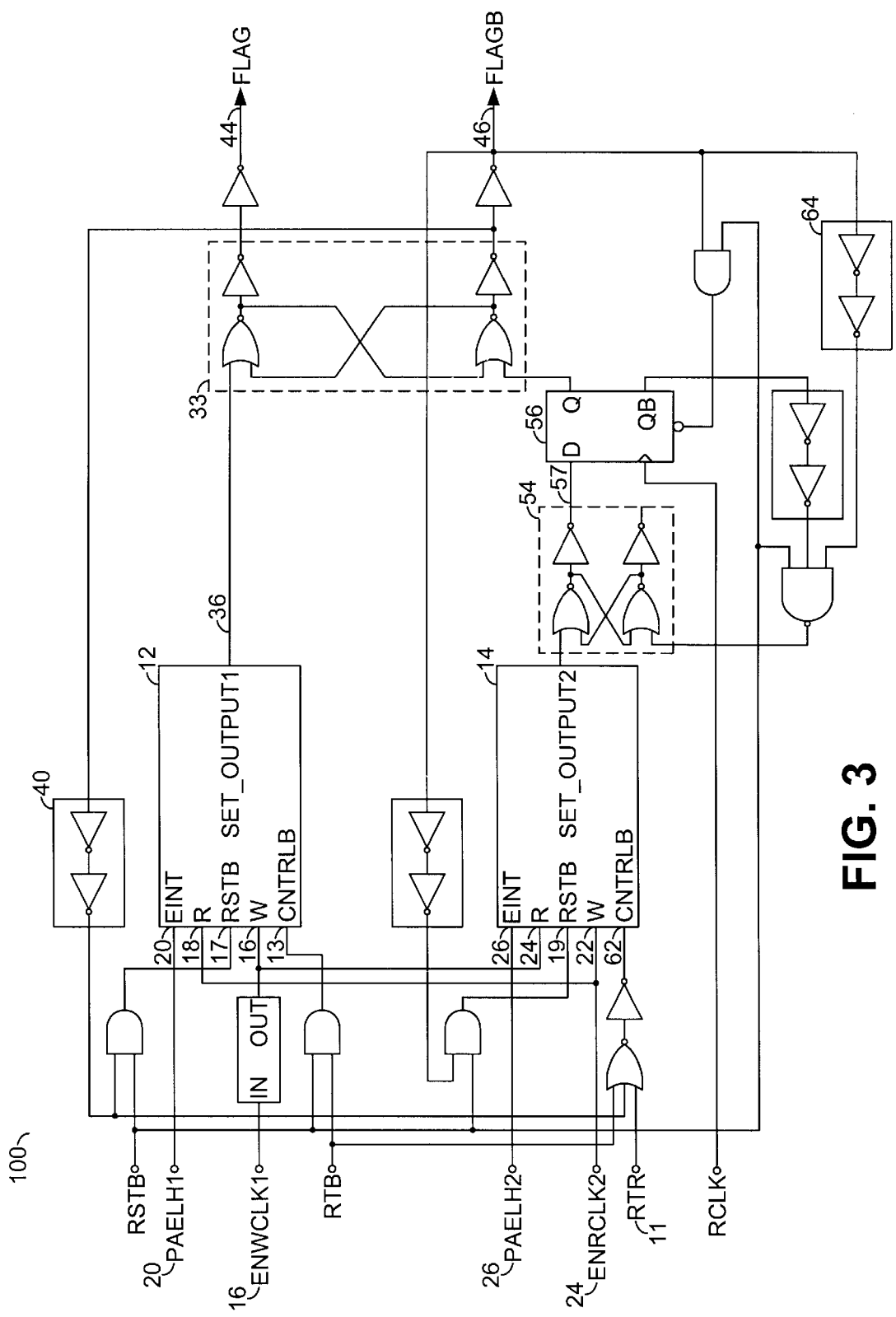
FIG. 3 depicts a more detailed block diagram of the Programmable Almost Empty (PAE) flag generator of FIG. 1.

Referring to FIG. 3, a more detailed block diagram of the Almost Empty flag generator 10 is shown. The first set state machine 12 receives the first, second and third inputs 20, 18, and 16, as well as a fourth input 13 that represents the first control signal. The first set state machine 12 also has a fifth input 17 that receives the external master reset input rstb. Similarly, the second set state machine 14 receives the first, second and third inputs 26, 24, and 22, as well as a fourth input 62 that represents the second control signal. The second set state machine 14 also has a fifth input 19 that also receives the external master reset input rstb. The second set state machine also receives a sixth input 11 that represents an external retransmit recovery signal rtr. The external retransmit recovery signal rtr and the external master reset signal rstb are additional input signals (not shown in FIG. 1) that provide a means to reset the flag generator 10 from an external source.

It is believed that a detailed schematic of the set state machine 12 (or 14) is known to a person skillful in the art and is not presented herein in all details. logic of the set state machine 12 is illustrated by the following Table 1:

| Row# | 000 | 001 | 011 | 010 | 110 | 111 | 101 | 100 | Set |
|------|-----|-----|-----|-----|-----|-----|-----|-----|-----|
| 0 | 0 | 1* | 2 | 3* | 4 | 5 | 6 | 7* | 1 |
| 1 | 0* | 1 | 2* | 3 | 4 | 5 | 6* | 7 | 1 |
| 2 | 0 | 1* | 2 | 3* | 4 | 5* | 6 | 7 | 1 |

-continued

| Row# | 000 | 001 | 011 | 010 | 110 | 111 | 101 | 100 | Set |
|------|-----|-----|-----|-----|-----|-----|-----|-----|-----|
| 3    | 0*  | 1   | 2*  | 3   | 4*  | 5   | 6   | 7   | 1   |
| 4    | 0   | 1   | 2   | 3*  | 4   | 13* | 14* | 7*  | 1   |
| 5    | 0   | 1   | 2*  | 3   | 4*  | 5   | 6*  | 7   | 1   |
| 6    | 0   | 1*  | 2   | 3   | 4   | 5*  | 6   | 7*  | 1   |
| 7    | 0*  | 1   | 2   | 3   | XX* | 5   | 14* | 7   | 1   |
| 8    | 0   | 9*  | 10  | 3*  | 4   | 13  | 14  | 7*  | 0   |
| 9    | 0*  | 9   | 10* | 3   | 4   | 13  | 14* | 7   | 0   |
| 10   | 0   | 9*  | 10  | 3*  | 4   | 13* | 14  | 7   | 0   |
| 11   | 0*  | 9   | 10* | 3   | 4*  | 13  | 14  | 7   | 0   |
| 12   | 0   | 9   | 10  | 3*  | 4   | 13* | 14  | 7*  | 0   |
| 13   | 0   | 9   | 10* | 3   | 4*  | 13  | 14* | 7   | 0   |
| 14   | 0   | 9*  | 10  | 3   | 4   | 13* | 14  | 7*  | 0   |
| 15   | 0*  | 9   | 10  | 3   | 4*  | 13  | 14* | 7   | 0   |

The individual columns are labeled as a three bit binary value. The first bit, when the Almost Empty flag generator 10 (of FIG. 1 ) is configured to generate an Almost Empty flag, represents the programmable Almost Empty look ahead signal paelh$_1$ 20 (of FIG. 1). The second bit represents the enabled write clock Enwclk$_1$ 16, whereas the third bit represents the enabled read clock Enrclk$_1$ 18. The column labeled Set represents the decoded output of the first set state machine 12.

A specified version of TABLE 1 where redundant states are eliminated is shown in the following TABLE 2:

| Row# | 000 | 001 | 011 | 010 | 110 | 111 | 101 | 100 | Set |
|------|-----|-----|-----|-----|-----|-----|-----|-----|-----|
| 0–3, 5, 6(a) | A | A | A | A | b | A | A | c | 1 |
| 4(b) | a | a | a | a | B | d | d | d(c) | 1 |
| 7(c) | a | a | a | a | C | a | d | C | 1 |
| 8–15(d) | b(a) | D | D | b(a) | b | D | D | c | 0 |

The logic of the second set state machine 14 is similar to the logic of the first set state machine and is not shown.

Thus, the present invention uses the first set state machine 12 and the second set state machine 14 that each handle two input clocks and a look-ahead signal. Each of the state machines 12 and 14 has four possible output states, as illustrated in TABLE 2. With design criteria requiring five input variables and eight output states, the implementation of two input set state machines 12 and 14 is far less complex than the implementation of a single state machine capable of handling all combinations. Furthermore, the simplicity of blocking logic blocks 28 and 30 allows one to maintain the simplicity of the set/set implementation of the present invention. While the use of smaller, more efficient set state machines 12 and 14 is superior using a single more complex state machine, the present invention can be implemented using a single larger state machine without departing from the spirit of the present invention.

Figure 4A:
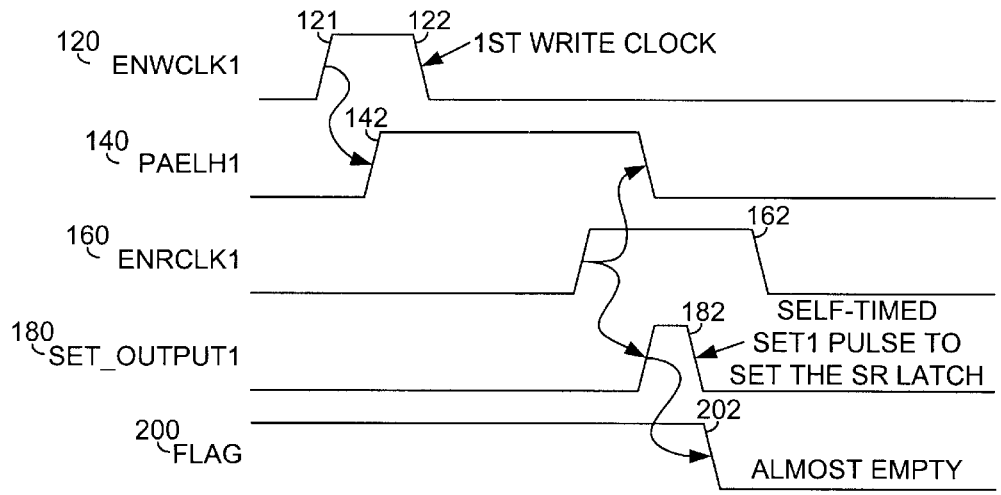
FIG. 4A illustrates a sequence of events for the first set state machine during the operation of the PAE flag generator of FIG. 1.
Figure 4B:
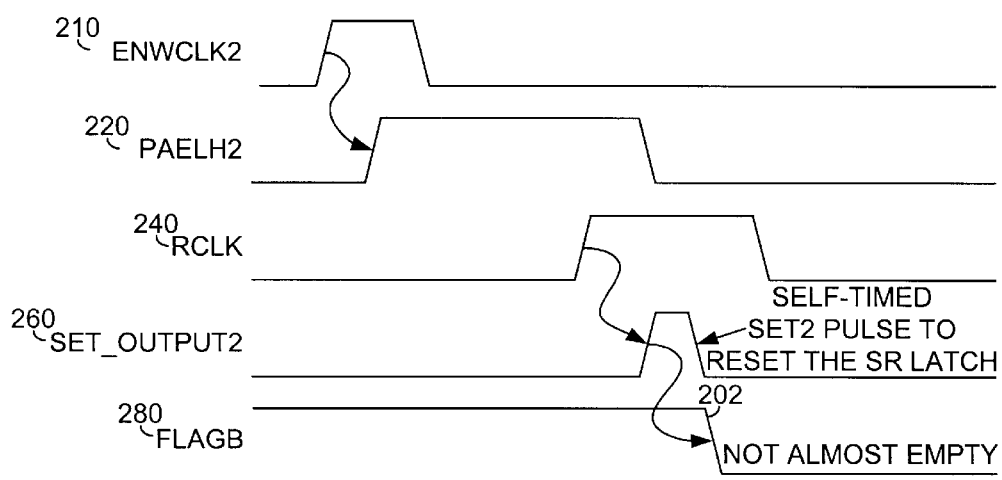
FIG. 4B depicts a sequence of events for the second set state machine during the operation of the PAE flag generator of FIG. 1.
Figure 5:
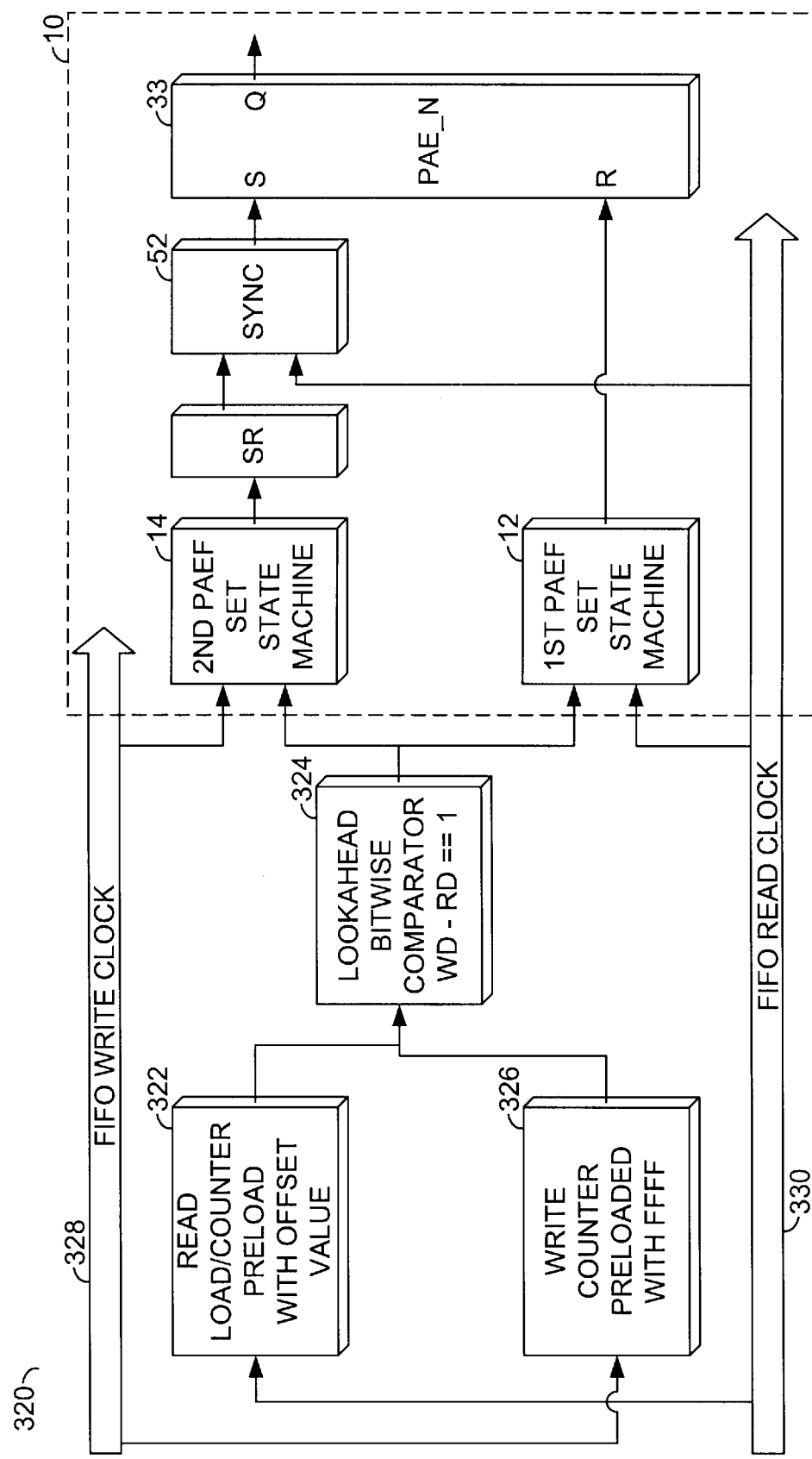
FIG. 5 shows the PAE flag generator at the architectural level of design.

FIG. 4A depicts a sequence of events for the first set state machine 12, whereas FIG. 4B depicts a sequence of events for the second set state machine 14 during the PAE flag generator 10 (of FIG. 1) operation. FIG. 5 depicts a block diagram 320 of the PAE flag generator at the architectural level of design.

At the architectural level, as shown in diagram 320 of FIG. 5, the PAE flag generator 10 (of FIG. 1) is synchronized by the write clock 328, shown as event diagram 210 of FIG. 4B. In the preferred embodiment of the present invention, the programmable offset value is first preloaded into the read/load counter 322 of FIG. 5. The concept of preloading the user programmable offset directly into the read counter upon programming allows one to eliminate the adder to adding up the read counter and the offset register. In one embodiment, the programmable offset value is 17-bit "000 . . . 0". In another embodiment, the programmable offset value is 17-bit "111 . . . 1".

In one embodiment, the programmable offset value is equal to (R+X), wherein X is the threshold, and R is the read function, as was stated above in Eq. (4). The read counter 322 of FIG. 5 increments R value from the offset value and up. As FIFO reaches the Almost Empty status at the next read cycle, the second set state machine generates a "set_output$_2$" pulse at the next rising edge of the free running read clock rCLK (shown as the event diagram 260 of FIG. 4B). The pulse "set_output$_2$" actually resets the programmable Almost Empty flag in S-R latch (54 of FIG. 1), and generates an active low signal state in the programmable Almost Empty flag (event diagram 200 of FIG. 4A).

Similarly, when the FIFO becomes Not Almost Empty, i.e. FIFO has more than (offset+1) words, the first set state machine 12 (of FIG. 1) generates a "set_output$_1$" pulse (depicted as event diagram 180 of FIG. 4A) at the next rising edge of the first write clock (shown as event diagram 120 of FIG. 4A). The "set_output$_1$" pulse within the first write clock pulse 120 is then synchronized by a rCLK 240 which then sets the programmable Almost Empty flag in S-R latch and makes the programmable Almost Empty go high (active low). The synchronizer block 52 consists of the SR-latch 54 followed by the flip-flop (FF) register 56 clocked by the rCLK clock 58. The SR-latch gets reset after the FF register 56 has been clocked high. The second set state machine is blocked/inhibited when the external flag is High, while the first set state machine is blocked/inhibited when the external flag is Low. This ensures that the final SR-latch (33 of FIG. 1) never receives simultaneous "set" and "reset" pulse which could lead into an illegal state for the SR-latch 33.

At the architectural level, as shown in diagram 320 of FIG. 5, the PAE flag generator utilizes the look ahead bitwise comparator 324 to generate both programmable Almost Empty look ahead signals Paelh$_1$ (shown as event diagram 160 of FIG. 4A), and Paelh$_2$ (shown as event diagram 220 of FIG. 4B)

In one embodiment of the present invention, the apparatus 10 of FIG. 1 for Almost Empty flag generation further includes a first delay block D1 40 configured to provide a first predetermined delay to the first set output signal 36 by increasing the path length for the control signal 13 to reach the first set state machine 12. In one embodiment, the delay D1 is used to increase a pulse width of the first set output signal 36. In one embodiment, the first delay 40 block further includes a first predetermined delay block having a first predetermined delay configured during fabrication.

Figure 6:
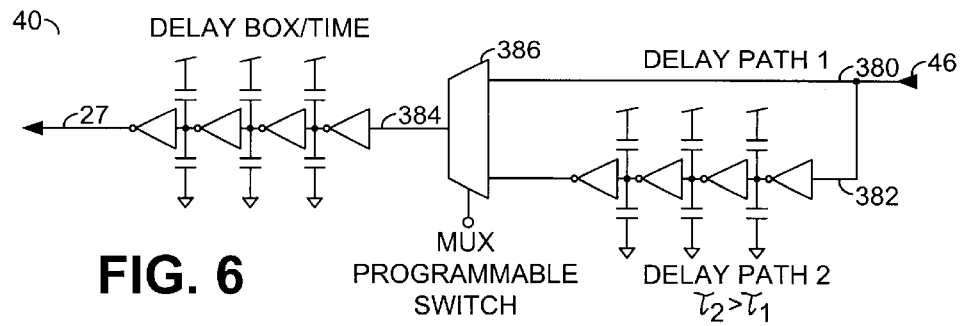
FIG. 6 illustrates the first delay block D1 configured to provide two paths with different paths lengths, or delays, to control signal for the first set state machine.

In an alternative embodiment, FIG. 6 illustrates the first delay block D1 40 configured to provide two paths 380 and 382 with different paths lengths, or delays, for control signal 13. In this embodiment, one of two paths 380 or 386 can be selected by using a programmable multiplexer switch (MAX1) 386.

Figure 7A:
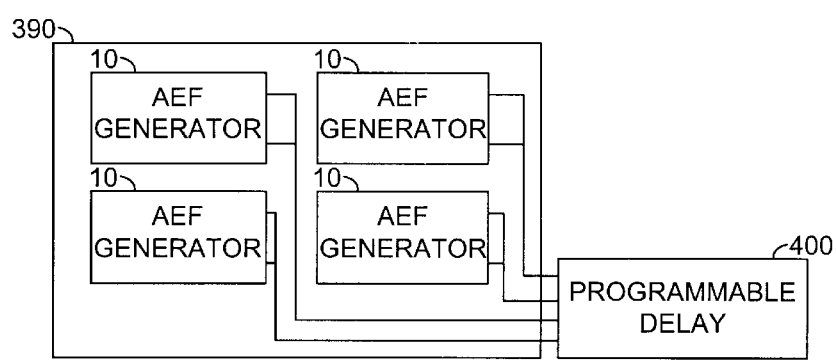
FIG. 7A shows how the joint test access group (JTAG) first programmable delay block is applied externally to the chip including the Almost Empty flag Generator.
Figure 7B:
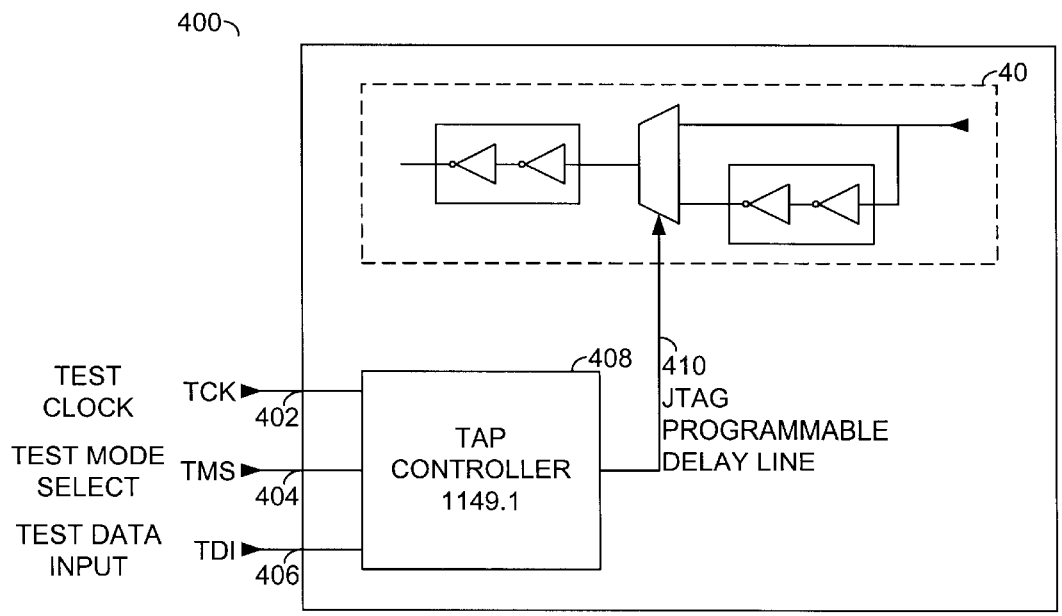
FIG. 7B depicts the first programmable delay block further comprising a joint test access group (JTAG) first programmable delay block, wherein the existing JTAG input ports are utilized by the TAP controller to program the JTAG delay line.

In one embodiment, the first delay block 40 further includes a first programmable delay block responsive to an externally generated signal. More specifically, in one embodiment, as depicted in FIG. 7B, the first programmable delay block 40 further comprises a joint test access group (JTAG) first programmable delay block, wherein the existing JTAG input ports 402 TCK (test clock port), 404 TMS (test mode selected), and 406 TD1 (test data input) including a set of additional JTAG instructions are utilized by the TAP controller 408 to program the JTAG delay line 410. FIG. 7A shows how the joint test access group (JTAG) first programmable delay block 400 can be applied externally to the chip 390 including the Almost Empty flag Generator.

Similarly, in one embodiment of the present invention, the apparatus 10 of FIG. 1 for Almost Empty flag generation further includes a second delay block D2 64 configured to provide a second predetermined delay to the second set output signal 53 by increasing the path length for the control signal 62 to reach the second set state machine 14. In one embodiment, the delay D2 is used to increase a pulse width of the second set output signal 53. In one embodiment, the second delay 64 block further includes a second predetermined delay block having a first predetermined delay (not shown) configured during fabrication.

In another embodiment, the second delay block D2 64 (not shown) further includes a first programmable delay block. In this embodiment, one of two paths can be selected by using a programmable multiplexer switch (MAX2) (not shown).

In one more embodiment, the second delay block D2 64 (not shown) further includes a first programmable delay block responsive to an externally generated signal. In one embodiment, the second programmable delay block D2 further comprises a joint test access group (JTAG) first programmable delay block, wherein the existing JTAG input ports TCK, TMS, TDI are utilized by the TAP controller to program the JTAG delay line.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A state machine comprising:
   a first input receiving a first write clock;
   a second input receiving a first read clock;
   a third input receiving a first programmable Almost Empty look-ahead signal,
   a fourth input receiving a second write clock;
   a fifth input receiving a second read clock; and
   a sixth input receiving a second programmable Almost Empty look-ahead signal,
   said state machine manipulating said inputs to produce an output signal representing an Almost Empty output flag that is at a first logic state when a FIFO is Almost Empty and is at a second logic state when said FIFO is Not Almost Empty.

2. An apparatus comprising:
   a first set state machine having a first input receiving a first write clock, a second input receiving a first read clock, a third input receiving a first programmable Almost Empty look-ahead signal, and a fourth input to receive a first control signal; said first set state machine manipulating said inputs to produce a first set_output signal that is either at a first logic state or at a second logic state;
   a second set state machine having a first input receiving a second write clock, a second input receiving a second read clock, a third input receiving a second programmable Almost Empty look-ahead signal, and a fourth input to receive a second control signal; said second set state machine manipulating said inputs to produce a second set_output signal that is either at said first logic state or at said second logic state;
   a synchronizer coupled to said second set state machine, said synchronizer receiving said second set_output signal and receiving a reset signal; said synchronizer configured to generate a synchronized output signal;
   a latch having a first input receiving said first set_output signal, a second input receiving said synchronized output signal, a first latch_output presenting said first set_output signal as a first latch_output signal, and a second latch_output presenting said synchronized output signal as a second latch_output signal, said latch being configured to hold said first latch_output signal and said second latch_output signal until said first set_output signal and second set output signal change logic states, said first latch_output signal representing an Almost Empty output flag that is at a first logic state when a FIFO (First In First Out) memory block is Almost Empty, and is at a second logic state when said FIFO is Not Almost Empty; said second latch_output signal representing said Not Almost Empty output flag that is at said first logic state when said FIFO is Not Almost Empty and is at said second logic state when said FIFO is Almost Empty;
   a first logic block having a logic input receiving said second latch_output signal, and a logic output presenting said second latch_output signal as said first control signal to said first set state machine;
   and
   a second logic block having a logic input receiving said first latch_output signal, a first logic output presenting said first latch_output signal as said second control signal to said second set state machine; and a second logic output presenting said first latch_output signal as said reset signal to said synchronizer.

3. The apparatus of claim 2, wherein said synchronizer further includes:
   an SR latch coupled to said second set state machine, said SR latch configured to receive said second set_output signal from said second set state machine, configured to receive said reset signal from said second logic block, and configured to time an output of said second set_output signal depending on said reset signal;
   and
   a Flip-Flop (FF) block coupled to said SR latch, said FF configured to receive said second set_output signal, and configured to time the presentation of said second set_output signal as said synchronized signal depending on an external timing signal.

4. The apparatus of claim 3, wherein said external timing signal further comprises:
   a free running read clock signal.

5. The apparatus of claim 2, wherein said FIFO comprises:
   a synchronous FIFO.

6. The apparatus of claim 2, wherein said first write clock further comprises:

a first enabled write clock.

7. The apparatus of claim 2, wherein said first read clock further comprises:

a first enabled read clock.

8. The apparatus of claim 2, wherein said second write clock further comprises:

a second enabled write clock.

9. The apparatus of claim 2, wherein said second read clock further comprises:

a second enabled read clock.

10. The apparatus of claim 2 further comprising:

a first delay block configured to provide a first predetermined delay to said first set_output signal in order to increase a pulse width of said first set_output signal.

11. The apparatus of claim 2 further comprising:

a second delay block configured to provide a second predetermined delay to said second set_output signal in order to increase a pulse width of said second set_output signal.

12. The apparatus of claim 10, wherein said first delay block further includes:

a first predetermined delay block having a first predetermined delay configured during fabrication.

13. The apparatus of claim 10, wherein said first delay block further includes:

a first programmable delay block configured to change a pulse width of said first set_output signal.

14. The apparatus of claim 10, wherein said first delay block further includes:

a first programmable delay block responsive to an externally generated signal.

15. The apparatus of claim 14, wherein said first programmable delay block further comprises:

a joint test access group (JTAG) first programmable delay block.

16. The apparatus of claim 14, wherein said first programmable delay block further comprises:

a joint test access group (JTAG) first programmable delay block, wherein the existing JTAG input ports including a set of additional JTAG instructions are utilized to program said JTAG delay line.

17. The apparatus of claim 11, wherein said second delay block further includes:

a second predetermined delay block having a second predetermined delay configured during fabrication.

18. The apparatus of claim 11, wherein said second delay block further includes:

a second programmable delay block configured to change a pulse width of said second set_output signal.

19. The apparatus of claim 11, wherein said second delay block further includes:

a second programmable delay block responsive to an externally generated signal.

20. The apparatus of claim 19, wherein said second programmable delay block further comprises:

a joint test access group (JTAG) second programmable delay block.

21. The apparatus of claim 19, wherein said second programmable delay block further comprises:

a joint test access group (JTAG) second programmable delay block, wherein the existing JTAG input ports including a set of additional JTAG instructions are utilized to program said JTAG delay line.

22. A method for indicating the almost empty status of at least one memory buffer comprising the steps of:

generating at least one Almost Empty output flag in response to a plurality of signals comprising:

a first write clock, a first read clock, a first programmable Almost Empty look-ahead signal, a second write clock, a second read clock, and a second programmable Almost Empty look-ahead signal;

generating at least one Not Almost Empty output flag in response to said plurality of signals ; and presenting said first write clock, said first read clock, said first programmable Almost Empty look-ahead signal, said second write clock, said second read clock, and said second programmable Almost Empty look-ahead signal to a state machine, wherein said state machine generates said at least one Almost Empty output flag and said at least one Not Almost Empty output flag.

23. The method of claim 22, wherein said step of generating said at least one Almost Empty output flag further includes the step of:

delaying said step of generation of said at least one Almost Empty output flag by a time delay.

24. The method of claim 22, wherein said step of generating said at least one not Almost Empty output flag further includes the step of:

delaying said step of generation of said at least one Not Almost Empty output flag by a time delay.

25. The method of claim 22, wherein said step of generating said at least one Almost Empty output flag further includes the steps of:

programming a time delay;

and delaying said step of generation of said at least one Almost Empty output flag by said programmable time delay.

26. The method of claim 22, wherein said step of generating said at least one Not Almost Empty output flag further includes the steps of:

programming a time delay;

and delaying said step of generation of said at least one Not Almost Empty output flag by said programmable time delay.

27. The method of claim 22, wherein said step of generating said at least one Almost Empty output flag further includes the steps of:

using JTAG to program a programmable time delay;

and delaying said step of generation of said at least one Almost Empty output flag by said JTAG programmable time delay.

28. The method of claim 22, wherein said step of generating said at least one Not Almost Empty output flag further includes the steps of:

using JTAG to program a programmable time delay;

and delaying said step of generation of said at least one Not Almost Empty output flag by said JTAG programmable time delay.

29. An apparatus comprising:

a first manipulating means for receiving a first plurality of input signals comprising: a first write clock, a first read clock, a first programmable Almost Empty look-ahead signal, and a first control signal; said first means manipulating said first plurality of input signals to produce a first output signal that is either at a first logic state or at a second logic state;

a second manipulating means for receiving a second plurality of input signals comprising: a second write clock, a second read clock, a second programmable Almost Empty look-ahead signal, and a second control signal; said second means manipulating said second plurality of input signals to produce a second output signal that is either at a first logic state or at a second logic state;

a synchronizer means for synchronizing said first output signal and said second output signal, said synchronizer means configured to receive said second output signal and configured to receive a reset signal; said synchronizer means configured to generate a synchronized output signal;

a latch means configured to receive said first set_output signal, and said synchronized output signal, said latch means configured to present said first output signal as a first latch_output signal, and said synchronized output signal as a second latch_output signal, said first latch_output signal representing an Almost Empty output flag that is at a first logic state when a FIFO memory block is Almost Empty, and is at a second logic state when said FIFO is Not Almost Empty; said second latch_output signal representing said Not Almost Empty output flag that is at said first logic state when said FIFO is Not Almost Empty and is at said second logic state when said FIFO is Almost Empty;

a first logic means configured to receive said second latch_output signal, and configured to present said second latch_output signal as a first control signal to said first manipulating means; and a second logic means configured to receive said first latch_output signal, configured to present said first latch_output signal as said second control signal to said second manipulating means, and configured to present said first latch_output signal as said reset signal to said synchronizer means.

30. The apparatus of claim 29 further comprising:
a first delay means configured to provide a first delay to said first output signal in order to increase a pulse width of said first output signal.

31. The apparatus of claim 29 further comprising:
a second delay means configured to provide a second delay to said second output signal in order to increase a pulse width of said second output signal.

32. The state machine according to claim 1, further comprising:
a seventh input configured to receive a first control signal; and
an eighth input configured to receive a second control signal, wherein said first control signal is generated in response to said output signal and said second control signal is generated in response to a complement of said output signal.

33. The method according to claim 22, wherein:
said plurality of signals further comprises said Not Almost Empty output flag and said Almost Empty output flag.

34. An apparatus comprising:
a first circuit configured to generate a first output signal and a second output signal in response to a first input signal, a second input signal, a third input signal, a fourth input signal, a first control signal and a second control signal; and
a second circuit configured to generate said first control signal, said second control signal and at least one flag signal in response to said first output signal, said second output signal and a clock signal.

35. The apparatus according to claim 34, wherein:
said first circuit comprises an asynchronous state machine; and
said second circuit comprises:
a latch circuit configured to generate said at least one flag signal in response to said first output signal and a synchronized output signal;
a synchronizer circuit configured to generate said synchronized output signal in response to said second output signal, said clock signal and said at least one flag signal; and
a logic circuit configured to generate said first and said second control signals in response to said at least one flag signal.

36. The apparatus according to claim 34, wherein said first circuit comprises:
a first set state machine configured to generate said first output signal in response to said first input signal, said second input signal, said third input signal and said first control signal; and
a second set state machine configured to generate said second output signal in response to said first input signal, said second input signal, said fourth input signal and said second control signal.

37. The apparatus according to claim 34, further comprising:
a third circuit configured to generate said third and fourth input signals having (i) a first state in response to a difference between a number of writes to said apparatus and a number of reads from said apparatus being greater than a first and a second predetermined value, respectively, and (ii) a second state in response to said difference being less than or equal to said first and second predetermined values, respectively.

38. The apparatus according to claim 37, wherein said first and second predetermined values are programmable.

39. The apparatus according to claim 34, wherein said at least one flag signal comprises one or more signals selected from the group consisting of an Almost Empty synchronous flag, a Not Almost Empty synchronous flag, a programmable Almost Empty synchronous flag and a programmable Not Almost Empty synchronous flag.

40. The apparatus according to claim 34, wherein said first, second, third and fourth input signals each comprise a signal selected from the group consisting of a read clock, a write clock, an enabled read clock, an enabled write clock, a look ahead signal, a programmable look ahead signal, a programmable Almost Empty look ahead signal.

41. A method for generating an Almost Empty flag in a FIFO memory comprising the steps of:
(A) generating a first output signal and a second output signal in response to a first input signal, a second input signal, a third input signal, a fourth input signal, a first control signal and a second control signal; and
(B) generating said first control signal, said second control signal and said Almost Empty flag in response to said first output signal, said second output signal and a clock signal.

42. The method according to claim 41, wherein step (A) comprises:

generating said first output signal in response to said first input signal, said second input signal, said third input signal and said first control signal via a first set state machine; and generating said second output signal in response to said first input signal, said second input signal, said fourth input signal and said second control signal via a second set state machine.

43. The method according to claim 41, further comprising the step of:

generating said third and fourth input signals having (i) a first state in response to a difference between a number of writes to said FIFO and a number of reads from said FIFO being greater than a first and a second predetermined values, respectively, and (ii) a second state in response to said difference being less than or equal to said first and second predetermined value, respectively.

44. The method according to claim 43, further comprising the step of:

programming said first and second predetermined values.

45. The method according to claim 41, wherein step (B) further comprises:

synchronizing said second output signal to said clock signal.

46. The method according to claim 41, wherein step (B) comprises:

generating said first and said second control signals in response to said Almost Empty flag.

47. The method according to claim 46, wherein the step of generating said first control signal and said second control signal further comprises:

delaying said Almost Empty flag by a first predetermined time delay; and delaying a complement of said Almost Empty flag by a second predetermined time delay.

48. The method according to claim 47, wherein said first and second predetermined time delays are programmable.

49. The method according to claim 48, further comprising:

programming said predetermined time delays via a test access port (TAP).

50. The method according to claim 41, wherein step (B) further comprises:

generating a Not Almost Empty flag.

51. The method according to claim 41, wherein step (B) further comprises:

generating a plurality of Almost Empty flags; and generating a plurality of Not Almost Empty flags.

52. The method according to claim 41, wherein said first, second, third and fourth input signals each comprise a signal selected from the group consisting of a read clock, a write clock, an enabled read clock, an enabled write clock, a look ahead signal and a programmable look ahead signal and a programmable Almost Empty look ahead signal.

* * * * *